United States Patent Office 3,522,223
Patented July 28, 1970

3,522,223
α-OLEFIN ELASTOMERS
Ray D. Taylor, Brecksville, Ohio, assignor to The B. F. Goodrich Company, New York, N.Y., a corporation of New York
No Drawing. Continuation-in-part of application Ser. No. 491,376, Sept. 29, 1965. This application Sept. 19, 1968, Ser. No. 760,979
Int. Cl. C08f 15/40
U.S. Cl. 260—80.78          9 Claims

ABSTRACT OF THE DISCLOSURE

In elastomeric α-olefin polymers such as copolymers of ethylene and propylene, improved green strength is obtained by means of small amounts of an organic peroxide and polyvalent metal salts of acrylic or methacrylic acid, without adversely affecting processability or other desirable properties of the polymer.

CROSS REFERENCE TO RELATED APPLICATION

This is a continuation-in-part of my copending application Ser. No. 491,376 filed Sept. 29, 1965, now abandoned.

BACKGROUND OF THE INVENTION

α-Olefin polymers such as copolymers of ethylene and propylene which have rubbery or elastomeric properties are commercially available. While such materials are readily formed into articles as tires and can be vulcanized, they are deficient in a property of natural rubber referred to in the art as "green strength."

Green strength in elastomers is understood by those skilled in the art to mean an inherent property of the polymer, both in the raw and compounded but unvulcanized state, to have the necessary internal strength and cohesive building tack necessary during processing and handling of uncured articles, without interferring with either the processability of the polymer and compounds thereof or physical properties of vulcanizates. This is particularly important in building tires.

SUMMARY OF THE INVENTION

Improved green strength in unvulcanized α-olefin elastomeric polymers is obtained when there is added to the polymers small amounts of an organic peroxide and a polyvalent metal salt of acrylic or methacrylic acid.

In one embodiment of this invention, with an α-olefin polymer, as an ethylene-propylene rubber, and less than 0.1 part of an organic peroxide and about 0.25 to about 1 part of a polyvalent metal acrylate or methacrylate, improvement in green strength of the ethylene-propylene rubber is readily obtained. While more than 1 part of the metal acrylate may be used, the minimum amount which contributes to improved green strength without impairment of other desirable properties is preferred and is normally less than about 3 parts.

DETAILED DESCRIPTION

α-Olefin polymers are normally prepared from α-olefins containing 2 to 10 carbon atoms. It is usually preferred to prepare rubbery or elastomeric poly(α-olefins) from olefins containing 2 to 5 carbon atoms. Ethylene, propylene and butene-1 and mixtures thereof are particularly useful. Rubbery poly(α-olefins) which contain olefinic unsaturation also are readily vulcanized when the polyvalent metal salts of acrylic acid or methacrylic acid are used with organic peroxides as the curing agents. Unsaturated polymers of α-olefins are prepared by polymerizing the α-olefin with aliphatic and alicyclic polyenes containing 4 to 10 carbon atoms and at least two >C=C< groups. Preferred interpolymers contain ethylene and at least one other α-olefin preferably containing from 3 to 5 carbon atoms. Usually such polymers contain about 50 mol percent or more of ethylene and such polymers may also contain less than 20% of a polyene. Particularly useful are elastomeric interpolymers containing less than 80 mol percent ethylene, at least 5 mol percent of another α-olefin such as propylene and butene-1; and polymers also containing a polyene in amounts to provide in the interpolymer, olefinic-unsaturation represented by an iodine number of from about 2 to about 35. Of course, the major advantage of the novel cure system of this invention is that completely saturated polymers of α-olefins are readily vulcanized without the necessity of having unsaturation or other reaction sites available in the polymers. Such polymers include those of ethylene and propylene; ethylene and butene-1; propylene and butene-1; ethylene, propylene and butene-1; ethylene and methylbutene; ethylene and 4-methyl pentene and the like. Unsaturated interpolymers include, for example, polymers containing a major proportion of ethylene, a lesser proportion of propylene and 0.1 to 10 percent of 1,4-hexadiene, dicyclopentadiene, butadiene, norbornene, 1,4,9-decatriene, methyl heptadiene, cyclooctadiene, cyclodecadiene, 1,4-pentadiene and the like.

The elastomeric interpolymers are prepared by polymerizing the monomers with catalysts which contain at least two essential components. The first component is a compound of a reducible transition heavy metal of groups IV, V, and VI of the Periodic Table, including particularly, titanium, zirconium, and vanadium, normally in the form of halides, oxyhalides and alcoholates. Such catalysts include $Ti(OR)_4$ wherein R is alkyl, $TiCl_4$, $VCl_4$, $VAc_3$, $VOCl_3$, vanadyl acetylacetonate and the like. The second component of the catalyst system are metals and compounds of groups I, II, and III of the Periodic Table, preferably lithium, sodium, magnesium, and aluminum, as the free metal, hydrides and organo-metallic compounds thereof. If the organo-metallic compounds, at least one valence bond should connect the metal with an organic radical. Such materials include lithium alkyls, aluminum trialkyls, aluminum dialkyl monohalides, aluminum monoalkyl dihalides, lithium hydride, aluminum hydride, aluminum alkyl hydrides, mixtures thereof, and the like. Preferred catalysts contain titanium tetrachloride or vanadyl oxychloride and alkyl aluminum halides, preferably the mono- and di-chlorides. The alkyl groups of the latter component will contain from 2 to 8 and preferably from 2 to 4 carbon atoms. Normally, the Group III metal compound will be present in molar excess in relation to the titanium or vanadium halide.

The polymerization reactions may be conducted in batch or continuous process and equipment. As is known, the equipment and monomers employed must be essentially free of oxygen, water and other polar compounds when the monomers are polymerized with a metal alkyl reduced titanium or vanadium catalyst. Solvents may be used, if desired, and they are normally treated to remove oxygen and water. Useful solvents include the aromatic hydrocarbons such as benzene, toluene, and the like. Chlorinated hydrocarbons such as perchloroethylene have been found to be very useful. Aliphatic hydrocarbons such as heptane and hexane also are useful.

The temperature and pressure for the polymerization reaction may be varied quite widely. Temperatures of polymerization may be varied from any temperature above the freezing point of the polymerization mixture to a temperature just below the boiling point of the reaction mixture. Excellent results have been obtained in the range of about −20° C. to about 25° C. In the same manner, while satisfactory polymerizations have been obtained at atmospheric pressure or at pressures of only a few pounds, the polymerization may be carried out at very high pressures.

Any polyvalent metal salt of acrylic and methacrylic acid may be used with the organic peroxide. For example, polyvalent metal salts of metals of groups II–A, II–B, III–A, IV–A, IV–B, V–A, V–B, VI–B, VII–B, and VIII of the Periodic Table. Salts of magnesium, calcium, barium, titanium, vanadium, chromium, iron, cobalt, nickel, cadmium, lead, tin, zinc, and aluminum have been found to be useful.

Organic peroxides used to treat the polymers of α-olefins include a great variety of materials for example, dicumyl peroxide, dibenzoyl peroxide, di-t-butyl peroxide, methylethyl ketone peroxide, t-butyl perbenzoate, cumene hydroperoxide, 2,5-dimethyl-2,5-di-t-butyl peroxyhexane, diisopropyl peroxide and the like. It is believed that aryl peroxides and hydroperoxides are more efficient. These peroxides preferably decompose at temperatures above about 100° F. The amount of organic peroxide used may be varied depending upon the nature of the polymer and other known factors.

To obtain optimum green strength of α-olefin polymers, less than 0.1 part of an organic peroxide is employed. Normally more than 0.001, as from about .01 to 0.095, preferably 0.05 of peroxide; and greater than 0.1, as 0.25 to less than 3, normally about 0.5 to 1.5, part of polyvalent metal acrylate or methacrylate per 100 parts of olefin polymer. The ratio of metal acrylate to peroxide is greater than 1:1, preferably 5:1 and greater, as about 100:1.

Green strength may be measured in several ways as has already been mentioned. The slope of the stress strain curve of a polymer gives an indication of whether or not the polymer has green strength. Those polymers having green strength are found to give a flat or positive slope while the slope of the stress strain curve is negative if the polymer has poor green strength. Further, the shape and area under the stress strain curve are another indication of green strength as is known to those skilled in the art. Polymers with poor green strength show lower moduli at higher elongation, and polymers with good green strength show higher moduli with greater elongation. If, on elongation the modulus decreases, the polymer is considered to have poor green strength. On the other hand if, on elongation, the modulus either does not decrease, or increases the polymer, is considered to have good green strength.

Usually the organic peroxide and polyvalent metal acrylate or methacrylate are added to the polymer in an internal mixer. Such materials, of course, can be introduced into the polymer in solution, dispersion and the like as is well-known. To obtain the desired improvement in green strength the mixture of polymer, organic peroxide and polyvalent metal acrylate may have to be heated to cause decomposition and formation of free radicals of the organic peroxide. The temperature for such decomposition of the organic peroxide is known for available peroxides and hydroperoxides and can be readily determined if not known. The mixtures may be heated during mixing, as in a Banbury or extruder, or may be mixed and heat separately. The temperature-time required to obtain improvement in green strength is readily determined by those skilled in the art. With dicumyl peroxide, it has been found that a temperature of about 5 to 20 minutes at 340 to 360° F. is adequate. As is obvious, longer periods of time will be required at lower temperatures and shorter periods of time at higher temperatures. Normally, one does not heat polyolefin polymers above about 400° F. and this is a practical upper maximum. Thus, the temperature at which the mixture is heated is required only to be greater than the decomposition temperature of the peroxide and less than the temperature at which the polymer begins to degrade. With very active peroxides that decompose at low temperatures sufficient heat may be generated during the mix cycle so that a temperature above 100° F. normally is sufficient.

The system of this invention is effective in the presence of other compounding materials and agents normally useful with olefin polymers. Such materials include reinforcing agents and fillers such as carbon blacks, metal oxides, clays, silica pigments, accelerators, antioxidants, coloring pigments, plasticizers, process and extending oils, and the like.

EXAMPLES

Example 1

To demonstrate the obtainment of enhanced green strength in unvulcanized polymers in accordance with this invention, an EPDM polymer (I) containing 52.7% ethylene and 3.3% ethylidene norbornene was compounded with 1% magnesium acrylate and 0.05% dicumyl peroxide; and an ethylene-propylene copolymer (II) containing 43% ethylene was compounded with 0.5% zinc acrylate and 0.025 dicumyl peroxide. These two compounds were then tested, with control polymers not containing the acrylate salt, by determining the modulus in pounds per square inch at various elongations at intervals of 200% until a break occurred at a rate of 10 inches per minute. The following data were obtained.

| Elongation, percent | I | | II | |
|---|---|---|---|---|
| | Control, p.s.i. | Compound, p.s.i. | Control, p.s.i. | Compound, p.s.i. |
| 100 | 59.3 | 71.3 | 28.6 | 36 |
| 300 | 43.5 | 68.6 | 17.6 | 41.6 |
| 500 | 35.9 | 67.2 | 12.1 | 46.4 |
| 700 | 34.5 | 67.5 | 8.8 | 48.1 |
| 900 | 33.4 | 69.6 | 6.3 | 48.2 |
| 1100 | 33.5 | 70.1 | 2.5 | 47.7 |
| 1300 | 32.1 | 73.9 | | |

When these two copolymers were compounded with 60 parts of HAF carbon black, 1 part stearic acid and 20 parts of processing oil (Flexon 766), and the test run again, similar results were obtained. A maximum modulus of 86.7 p.s.i. was obtained for the EPDM copolymer containing both acrylate salt and peroxide, while at 500% elongation the control was only 18.1 p.s.i. The EP polymer containing peroxide and acrylate salt had a maximum modulus of 54 p.s.i. while the control was only 27.5 p.s.i. at 300% elongation. Building tack, observed visually, was also improved. Compounds mixed in Banbury at 350° F. for 10 min.

Example 2

The procedure of Example 1 was essentially repeated and a series of compounds as set forth in the data table below were prepared by mixing in a Banbury for 10 minutes at 350° F. the defined metal acrylate and amounts of dicumyl peroxide. The control without the metal acrylate was also mixed for this same time at 350° F.

| | 1 | 2 | 3 |
|---|---|---|---|
| | P.s.i. | P.s.i. | P.s.i. |
| EPDM (I) | 100 | 100 | 100 |
| Zinc acrylate | | 0.5 | |
| Magnesium acrylate | | | 1.0 |
| Dicumyl peroxide | | 0.025 | 0.05 |
| Modulus, p.s.i. | | | |
| Elongation, percent: | | | |
| 100 | 59.3 | 73.2 | 71.3 |
| 300 | 43.5 | 73.0 | 68.6 |
| 500 | 35.9 | 72.1 | 67.2 |
| 700 | 34.5 | 69.8 | 67.5 |
| 900 | 33.4 | 66.9 | 69.6 |
| 1,100 | 33.5 | | 70.1 |
| 1,300 | 32.1 | | 73.9 |

When this example is repeated with iron acrylate, aluminum acrylate, cadmium acrylate and barium acrylate, improvement in green strength is also obtained.

A similar series was run and tested on an ethylene-propylene copolymer and the following results obtained:

|  | P.s.i. | P.s.i. |
|---|---|---|
| EP | 100 | 100 |
| Zinc Acrylate | | 0.5 |
| Dicumyl peroxide | | 0.025 |
| Elongation, percent | | |
| 100 | 28.6 | 36.0 |
| 300 | 17.6 | 41.6 |
| 500 | 12.1 | 46.4 |
| 700 | 8.8 | 48.1 |
| 900 | 6.3 | 48.2 |
| 1,100 | 2.5 | 47.7 |

Example 3

A sample of a copolymer of ethylene, propylene and 1,4-hexadiene containing about 53% ethylene and 3.3% 1,4-hexadiene was mixed in a Banbury for 20 minutes at 350° F. with 0.5 part zinc acrylate and 0.05 part of dicumyl peroxide. The 300% modulus was 168.8 p.s.i. while the 300% modulus of a control without the zinc acrylate was only 73.5 p.s.i. This copolymer was also compounded in a ratio of 100 parts of copolymer, 5 parts of zinc oxide, 60 parts of high abrasion furnace black, 1 part of stearic acid and 20 parts of a processing oil (Flexon 766). The 300% modulus of this compound was 80 p.s.i., the measured area under the stress-strain curve, was 22.6 sq. inches and the 8 minute large rotor Mooney at 212° F., 60.5. When the same compound was prepared with 0.5 zinc acrylate and 0.05 dicumyl peroxide, the 300% modulus was 185 p.s.i., the stress-strain curve had a positive slope and the area under the curve was 55.8 sq. inches, and the Mooney value was 61.5. Both samples were tested for extrusion properties through a Garvey die and equivalent ratings were obtained for the two compounds. The cure characteristics and ultimate physical properties of the polymer containing the peroxide and acrylate salt were not adversely affected as compared to the untreated polymer. This was demonstrated by adding to these compounds 1.5 parts of tetramethyl thiuram monosulfide, 0.75 part of mercaptobenzothiazole, and 1.5 parts of sulfur. The cure characteristics and scorch rate were tested and the compounds vulcanized for comparative physical testing and were found to be essentially equivalent. The compound containing the zinc acrylate and dicumyl peroxide exhibits improved green strength and building tack in tires, when compared to the tires built from polymers which do not contain the zinc acrylate and dicumyl peroxide.

I claim:

1. A mixture of an α-olefin polymer which comprises a polymer containing at least two α-olefins, less than 0.1 part of an organic peroxide, and greater than 0.1 to less than 3 parts of a polyvinyl metal salt of metals of groups II-A, II-B, III-A, IV-A, IV-B, V-A, V-B, VI-B, VII-B and VIII of the Periodic Table of acrylic acid or methacrylic acid per 100 parts of polymer.

2. A mixture of claim 1 wherein the α-olefin polymer comprises a composition containing a copolymer of ethylene and at least one other α-olefin, and there is from about 0.005 to less than 0.1 by weight part of an organic peroxide, and therefore 0.25 to less than 3 weight parts of a polyvalent metal acrylate or methacrylate 100 weight parts of olefin polymer.

3. A mixture of claim 2 wherein the α-olefin polymer comprises a copolymer containing ethylene, at least one other α-olefin and a polyene containing 4 to 10 carbon atoms and at least two >C=C< groups and there is about 0.01 to 0.05 weight part of an organic peroxide, about 0.50 to 1.5 weight part of a polyvalent metal salt of acrylic acid or methacrylic acid per 100 weight parts of polymer.

4. The mixture of claim 2 wherein the olefin polymer contains a major proportion of ethylene and lesser proportions of propylene, the organic peroxide is dicumyl peroxide and the polyvalent metal salt is selected from the group consisting of acrylic and methacrylic acid salts of magnesium, calcium, barium, titanium, vanadium, chromium, iron, cobalt, nickel, cadmium, lead, tin, zinc, or aluminum.

5. The mixture of claim 3 wherein the olefin polymer contains a major proportion of ethylene and lesser proportions of propylene, the organic peroxide is dicumyl peroxide and the polyvalent metal salt is selected from the group consisting of acrylic and methacrylic acid salts of magnesium, calcium, barium, titanium, vanadium, chromium, iron, cobalt, nickel, cadmium, lead, tin, zinc, or aluminium.

6. The mixture of claim 5 wherein the polyene is selected from the group consisting of 1,4-hexadiene, dicyclopentadiene, ethylidene norbornene and methyltetrahydroindene.

7. The mixture of claim 6 wherein the acrylic acid salt is zinc acrylate.

8. A process for preparing improved α-olefin elastomers which comprises heating at a temperature of above about 100° F. to about 400° F. a composition containing a polymer of at least one α-olefin, less than 0.1 part of an organic peroxide curing agent, and less than 3 parts of a polyvalent metal salt of metals of groups II-A, II-B, III-A, IV-A, IV-B, V-A, V-B, VI-B, VII-B and VIII of the Period Table of acrylic acid or methacrylic acid per 100 parts of polymer.

9. The process of claim 8 wherein the copolymer contains ethylene, at least one other α-olefin and a polyene containing 4 to 10 carbon atoms and at least two >C=C< groups, about 0.01 to 0.09 weight part of an organic peroxide and about 0.25 to 1 weight part of a polyvalent metal salt of acrylic acid or methacrylic acid per 100 weight parts of olefin polymer and heating the mixture at a temperature of about 200 to 500° F.

References Cited

UNITED STATES PATENTS 3,236,917   2/1966   Natta _____ 260—878

JOSEPH L. SCHOFER, Primary Examiner

R. S. BENJAMIN, Assistant Examiner

U.S. Cl. X.R.

260—88.2, 93.7, 94.9

UNITED STATES PATENT OFFICE
CERTIFICATE OF CORRECTION

Patent No. 3,522,223          Dated July 28, 1970

Inventor   RAY D. TAYLOR

It is certified that error appears in the above-identified patent and that said Letters Patent are hereby corrected as shown below:

Column 5, line 52, Claim 1, "polyvinyl" should read ---polyvalent---.

Signed and sealed this 20th day of May 1975.

(SEAL)
Attest:

RUTH C. MASON
Attesting Officer

C. MARSHALL DANN
Commissioner of Patents
and Trademarks